United States Patent [19]
Sugiura et al.

[11] Patent Number: 5,706,104
[45] Date of Patent: Jan. 6, 1998

[54] IMAGE RECEIVING APPARATUS

[75] Inventors: Kenichiro Sugiura, Funabashi; Masanao Yasuda, Tokyo; Yoshinori Yamaguchi, Yamato; Hideyuki Kobayashi; Naoshi Inoue, both of Tokyo; Michihei Murayama, Tachikawa, all of Japan

[73] Assignee: Canon Kabushiki Kaisha, Japan

[21] Appl. No.: 181,971

[22] Filed: Jan. 18, 1994

Related U.S. Application Data

[63] Continuation of Ser. No. 422,549, Oct. 17, 1989, abandoned.

[30] Foreign Application Priority Data

Oct. 28, 1988 [JP] Japan .................. 63-274017

[51] Int. Cl.⁶ .................. H04N 1/32; H04N 1/40
[52] U.S. Cl. .................. 358/444; 358/442
[58] Field of Search .................. 358/400, 403, 358/404, 406, 401, 474, 476, 479, 484, 440, 442, 443, 444

[56] References Cited

U.S. PATENT DOCUMENTS

| | | | |
|---|---|---|---|
| 4,591,997 | 5/1986 | Grabel | 358/444 |
| 4,719,516 | 1/1988 | Nagashima | 358/448 |
| 4,759,053 | 7/1988 | Satomi | 379/100 |
| 4,769,719 | 9/1988 | Endo | 358/444 |
| 4,785,355 | 11/1988 | Matsumoto | 358/476 |
| 4,821,107 | 4/1989 | Naito et al. | 358/440 |
| 4,827,349 | 5/1989 | Ogata et al. | 358/442 |
| 4,975,783 | 12/1990 | Takaoka | 358/404 |
| 5,016,114 | 5/1991 | Sakata et al. | 358/404 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image receiving apparatus is disclosed which has a printer for printing image data, an interface device for storing received image data into an outside memory detachable to the apparatus and for reading out the image data from the outside memory, and a selector for selecting whether received image data is to be printed by the printer or is to be stored into the outside memory.

20 Claims, 4 Drawing Sheets

IMAGE RECEIVING APPARATUS

This application is a continuation-in-part continuation division, of application Ser. No. 07/422,549 filed Oct. 17, 1989 now abandoned.

BACKGROUND OF THE INVENTION

1. Field of the Invention

This invention relates to an image receiving apparatus for receiving image data.

2. Background

One type of conventional image receiving apparatus, e.g. a conventional facsimile apparatus, prints out received image data when the image data is received. Another type of facsimile apparatus prints out received image data after the received image data is temporarily stored in an image memory.

Thus, the above-mentioned types of conventional facsimile apparatus always print out received image data. Therefore, even though some received image data may not be useful, it is nevertheless printed out on recording paper, and the recording paper is wasted with the useless image data.

The present inventors have considered whether all received image data should be stored in an image memory of a facsimile apparatus, and thereafter the stored image data displayed by a display device, e.g. a CRT (Cathode Ray Tube) for confirming or identifying the received image data.

However, if all the received image data is stored in the image memory of the facsimile apparatus, a large capacity image memory is required, and an operator has to designate print out for the received data every time the operator wants a hard copy of the image data. This may make the operation of the apparatus complicated or burdensome.

SUMMARY OF THE INVENTION

An object of the present invention is to provide a novel image receiving apparatus which overcomes the above-mentioned shortcomings.

Another object of the present invention is to provide an image receiving apparatus which has an input/output interface for storing and reading out received image data to an outside memory and a selector for selecting whether the received image data is to be printed or to be stored in the outside memory. Thereby, an operator can select whether the received data is to be printed out or to be stored into the outside memory.

Another object of the present invention is to provide an image receiving apparatus which is structured such that if the outside memory is attached to the apparatus, the received image data is to be stored into the outside memory, and that if not the received image data is to be printed out. Thereby, an operator can select the outside memory or hard copy with easy operation.

There are, of course, additional features of the invention that will be described in the following detailed description with reference to the accompanying drawings. Those skilled in the art will appreciate that the conception upon which this disclosure is based may readily be utilized as a basis for designing other structures and methods for carrying out the purposes of the invention. It will be understood what the claims are to be regarded as including such other constructions and methods as do not depart from the spirit and scope of the invention.

DETAILED DESCRIPTION OF THE PREFERRED EMBODIMENT

Figure 1:
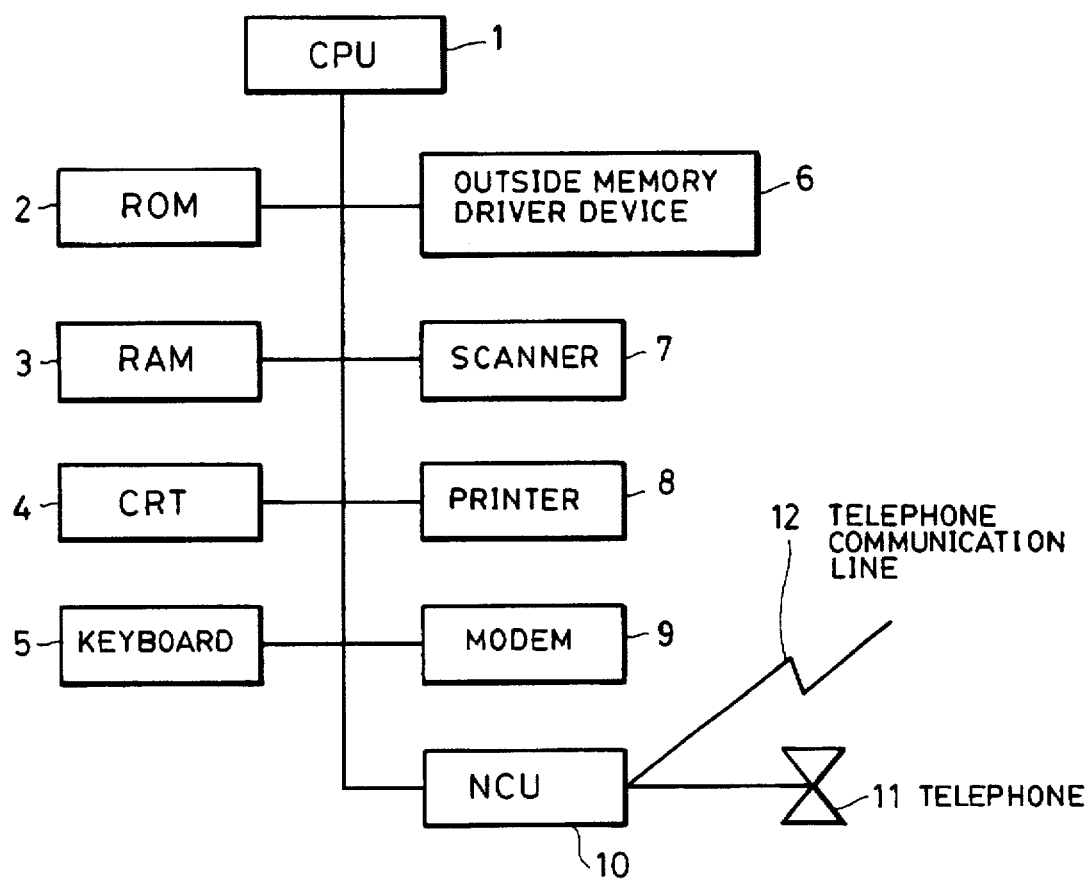
FIG. 1 is a block diagram showing a structure of an image receiving apparatus of an embodiment.

Referring to the drawings, an embodiment of the present invention is explained in detail, as follows.

FIG. 1 is a block diagram showing a structure of the embodiment of an image receiving apparatus according to the present invention.

This image receiving apparatus comprises a CPU (Central Processing Unit) 1 for controlling the entire apparatus and includes a microcomputer, a ROM (Read Only Memory) 2 for storing a control program of the CPU 1, a RAM (Random Access Memory) 3 for temporarily storing data and for loading commands of the control program and the control program itself, a CRT (Cathode Ray Tube) display 4 for displaying image data, etc, and a keyboard 5 for inputting various kinds of information and having a plurality of keys and switches.

An outside memory driver device 6 is also provided for storing the received image data into an outside memory which is detachable from the apparatus. In this embodiment the outside memory utilizes a flexible magnetic disc and the driver device 6 is a driver for the flexible magnetic disc. The driver device 6 functions as an input/output interface for writing the received image data and for reading out the stored image data to and from the flexible magnetic disc.

The image receiving apparatus of this embodiment also includes a scanner 7 for reading an original sheet and for obtaining a electric image signal corresponding to an original image, a printer 8 for printing image data, a MODEM 9 for modulating and demodulating signals, and a network control unit (NCU) 10 for connecting a telephone communication line 12 to either the MODEM 9 or a telephone 11.

The image receiving apparatus of this embodiment is constructed as mentioned above, and operates such that the CPU 1 controls and selects whether coded image data received via the line 12, the NCU 10 and the MODEM 9 is to be stored into the outside memory by the driver device 6 or whether it is to be decoded and printed out by the printer 8.

In this specification, the operation of storing received image data to the outside memory is termed "Soft Fax."

Figure 2:
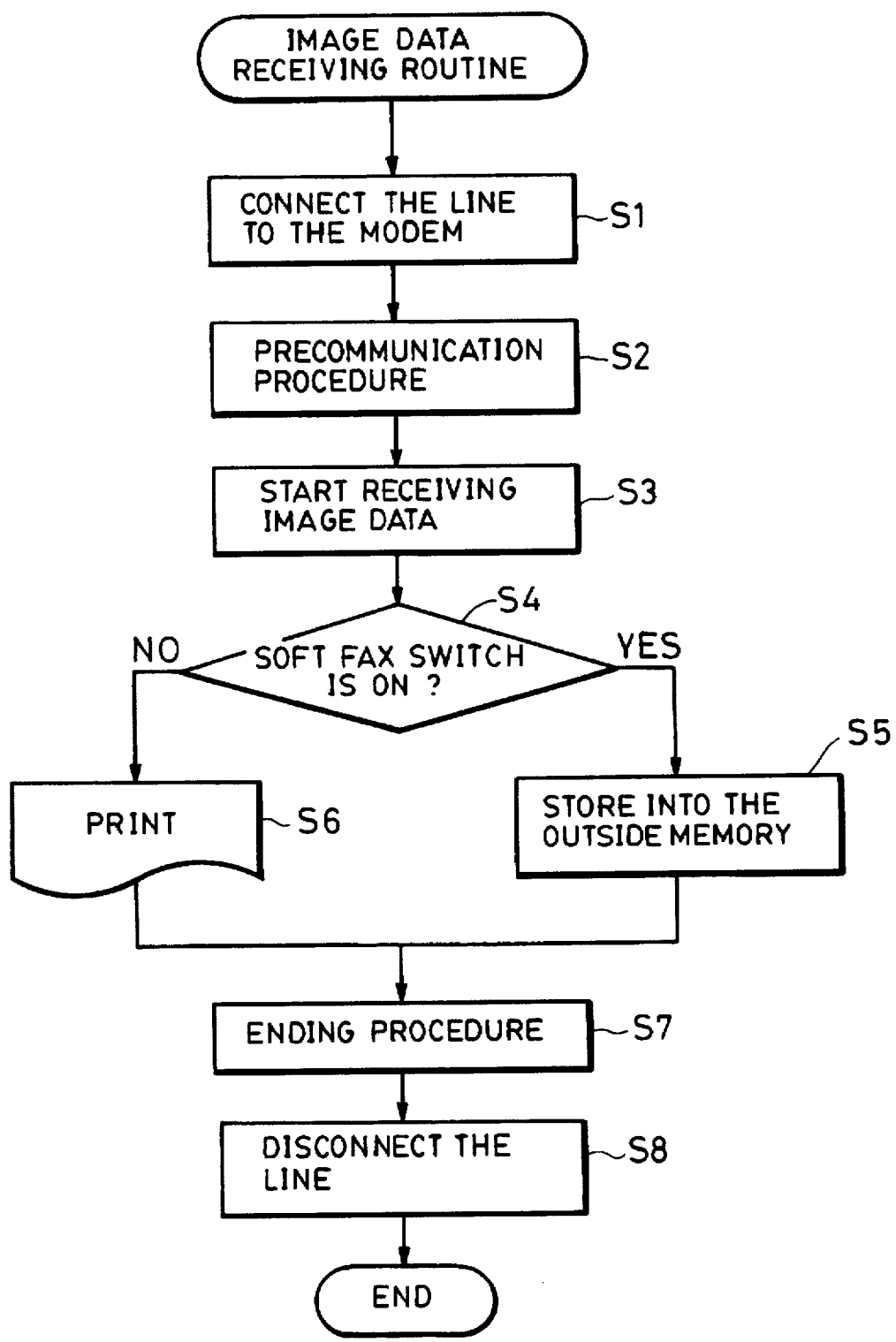
FIG. 2 is a flowchart showing a control operation of a CPU (Central Processing Unit) in FIG. 1 during a receiving operation.

The receiving operation of the image receiving apparatus is carried out based on a control program stored in the ROM 2, which is shown in FIG. 2. The receiving operation is usually activated in response to a calling signal Ci from the line 12, and will be so illustrated herein.

In step S1, when the CPU 1 detects the calling signal Ci, the CPU 1 causes the NCU 10 change a relay to connect the communication line 12 with the MODEM 9.

The CPU 1 carries out a pre-communication procedure of facsimile transmission, e.g., T30 of the CCITT recommendation, to determine a communication or receiving mode in step S2.

The CPU 1, in step S3, starts receiving image data with the mode determined in step S2. In step S4, the CPU 1 discriminates whether a Soft Fax switch for storing received image data into the flexible disc attached to the driver device 6 is on ("1") or off ("0").

Figure 3:
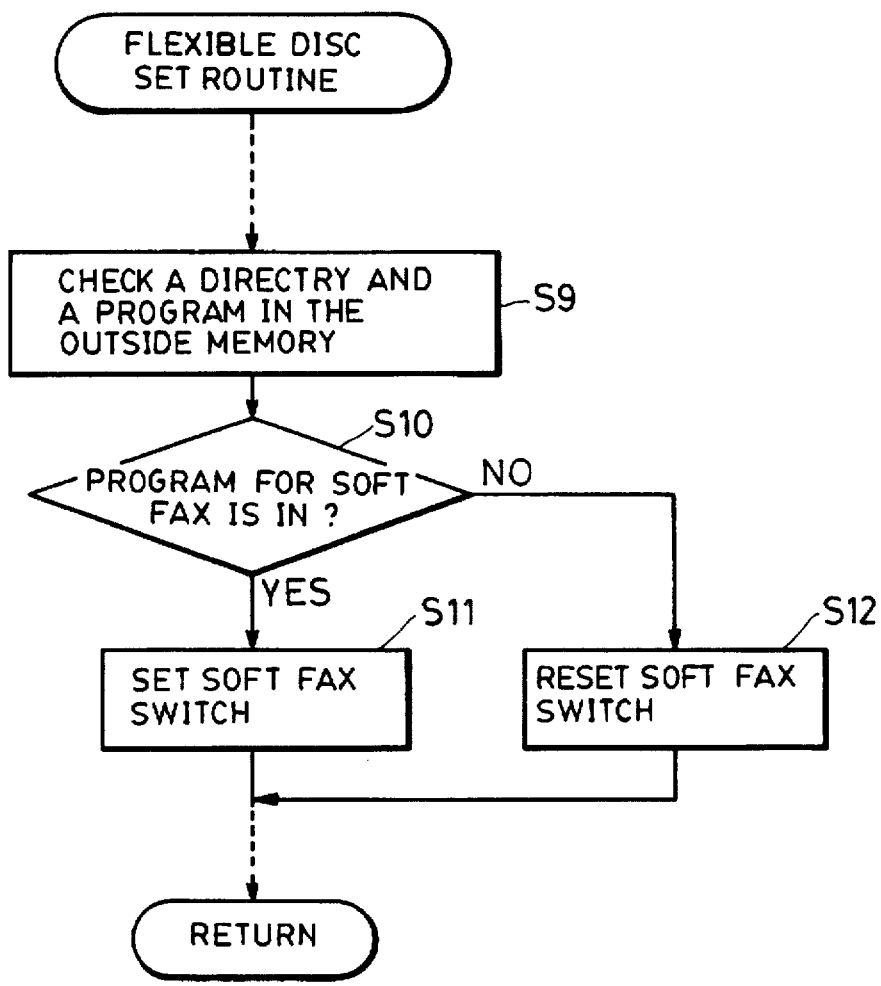
FIG. 3 is an interruption routine of the CPU, which is activated on attaching an outside memory device.
Figure 4:
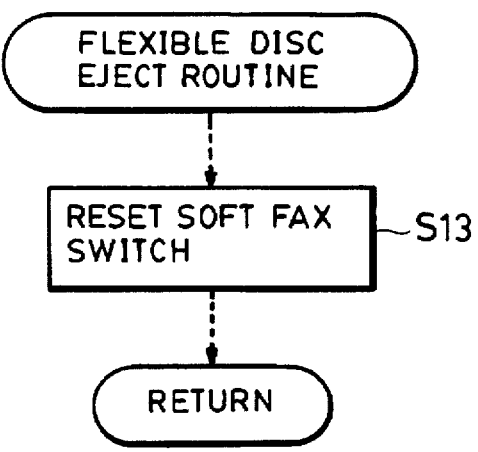
FIG. 4 is another interrupting routine of the CPU, which is activated on detaching the outside memory device.

The Soft Fax switch is a flag located at a predetermined area of the RAM 3, and is set to "1" and reset to "0" by programs shown in FIGS. 3 and 4. If the Soft Fax switch is on, the CPU 1 causes the received coded image data to be stored in the flexible disc attached to the driver device 6. If not, the CPU 1 decodes the received coded image data and causes the printer 8 print out the image data on a receiving sheet.

When the receiving operation is completed, the CPU 1 carries out an ending procedure of the facsimile communication procedure in step S7, and causes the NCU 10 release and disconnect the line 12 in step S8.

FIG. 3 illustrates a flexible disc set routine which is activated when the flexible magnetic disc is loaded to the driver device 6, and is therefore an interruption routine activated by loading of the flexible disc.

In step S9, a control program and a directory stored in the loaded flexible disc are loaded or transferred to the RAM 3, and the CPU 1 checks whether the loaded disc is an appropriate outside memory for Soft Fax or not. A plurality of checking methods might be considered, but in this embodiment the CPU 1 checks whether the loaded flexible disc has the control program for Soft Fax or not.

In step 9, the CPU 1 searches the program stored in the flexible disc, and the CPU 1 determines whether the loaded flexible disc has the program for Soft Fax or not. If it does, the CPU 1 sets the Soft Fax switch in the RAM 3 on in step S11. If not, the CPU 1 resets the Soft Fax switch to off ("0") condition in step S12.

A program of step S5 in FIG. 2 is the program read from the loaded flexible disc into the RAM 3.

FIG. 4 illustrates an eject dealing routine which is activated when the loaded flexible disc is detached from the driver device 6. This routine is therefore an interruption routine activated by a signal indicating unloading of the flexible magnetic disc.

In step S13, the CPU 1 resets the Soft Fax switch in the off condition, and sets "0" in the corresponding area of the RAM 3.

As described above, the image receiving apparatus in this embodiment can select easily whether the received image data is to be printed out by the printer 8 or is to be stored in the outside memory by the driver device 6.

The outside memory also stores document identification corresponding to stored image data. The document identification includes, for example, a received date, a name of a sending station, a telephone number of the sending station, and the like.

The CPU 1 controls reading out of the outside memory and displaying the read out image data on the CRT display 4, as follows.

Figure 5:
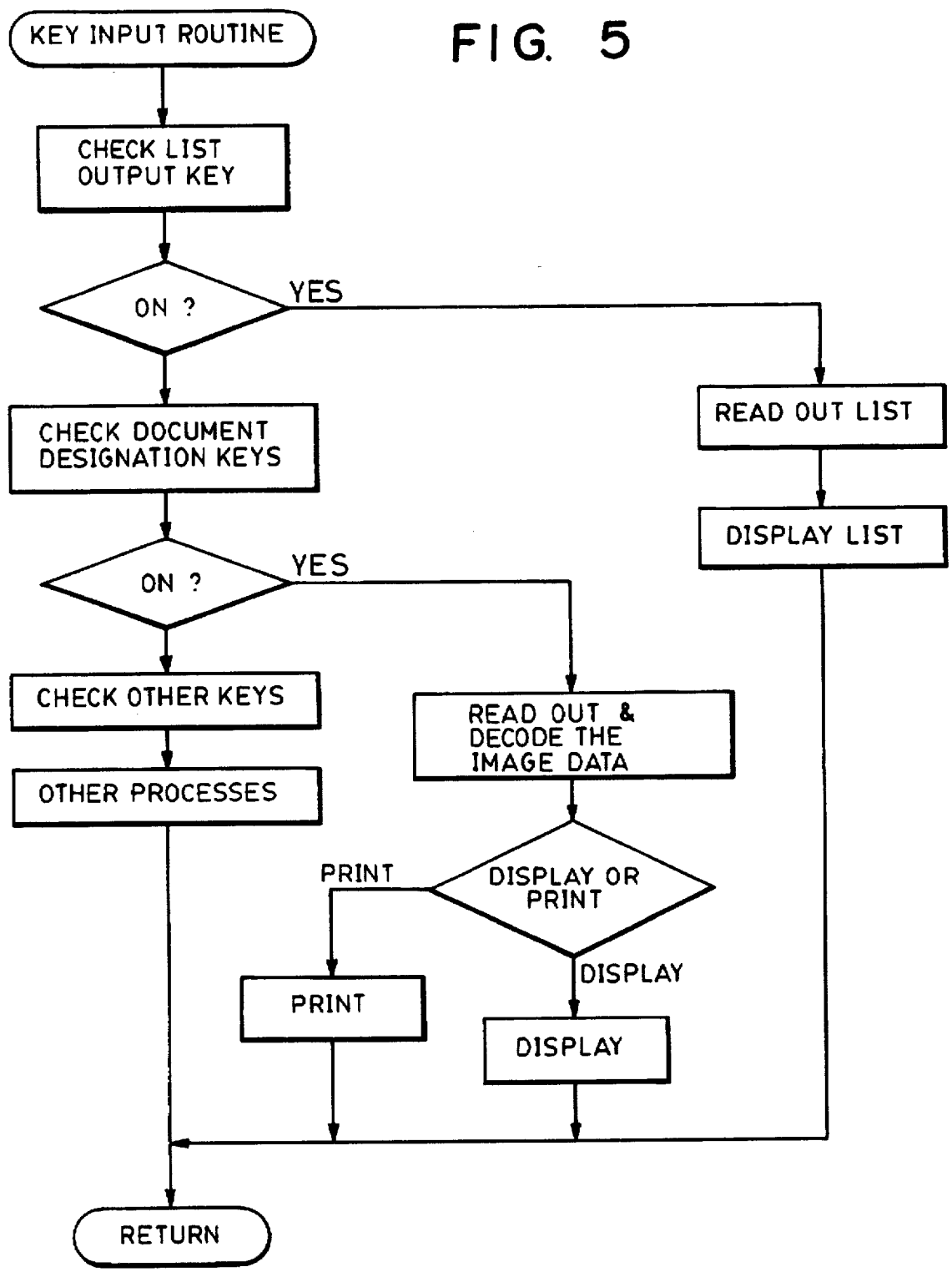
FIG. 5 is a key input routine of the CPU.

First of all, based on an order key-input by an operator, the CPU 1 reads out a list of the document identification from the outside memory via the driver device 6 and displays the list on the CRT display 4. Then the operator designates a specified document identification with keys of the keyboard 5 to print out the designated image data or to display it. The CPU 1 controls reading out the image data corresponding to the designated document identification and decoding the image data for printing out by the printer 8 or for display by the CRT display. This process is shown in FIG. 5 as a key input routine of the CPU 1.

Although a particular embodiment of the present invention is herein described in detail for explanation, various modification thereof, after study of this specification, will be apparent to those of ordinary skill in the art to which the invention pertains. For example, the apparatus can be designed such that not only an outside memory but also the outside memory driver device may be detachable from the apparatus.

In the illustrated embodiment, the received image data is stored into the outside memory provided that the outside memory is loaded to the apparatus and that the outside memory has a program for Soft Fax. However, the apparatus can be designed such that it stores in the outside memory itself a flag showing it is an outside memory for Soft Fax. Further, the keyboard 5 or another part of the apparatus may have a selection switch for choosing printing or storing.

As described above, the present invention presents a useful image receiving apparatus which has a mode for printing the received image data as it is received, and also has another mode for storing the received image data in an outside memory and for visualizing when it is needed.

In accordance with another feature of the present invention, the image receiving apparatus can easily change between two modes for printing the received image data as it is received, and for storing the received image data into an outside memory.

What is claimed is:

1. An image receiving apparatus comprising:
    means for receiving image data;
    a printer for printing received image data;
    means for interfacing between the receiving apparatus and a detachable outside memory loadable to said apparatus for storing received image data into the outside memory and for reading out stored image data from the outside memory, said apparatus being selectively operable in at least a first mode wherein received image data is printed by said printer and not stored in the outside memory and a second mode wherein received image data is stored in the outside memory and not printed by said printer;
    means for detecting if the outside memory is loaded to said apparatus, and if the loaded outside memory is appropriate for use in said second mode; and
    means for selecting operation in said second mode when said detecting means detects that the outside memory is loaded and appropriate, and for selecting operation in said first mode otherwise.

2. An image receiving apparatus according to claim 1, wherein said detecting means detects that the loaded outside memory is appropriate if the loaded outside memory contains a storing control program for storing received image data into the loaded outside memory.

3. An image receiving apparatus, according to claim 2, wherein said interfacing means loads the storing control program from the loaded outside memory.

4. An image receiving apparatus, according to claim 1, further comprising means for designating a part of image data among stored image data in the outside memory.

5. An image receiving apparatus, according to claim 1, further comprising means for visualizing image data stored in the outside memory.

6. An image receiving apparatus according to claim 1, wherein said interfacing means is structured to have loaded thereto a magnetic flexible disc as the outside memory.

7. An image receiving apparatus comprising:
    means for receiving image data;

a printer for printing received image data;

means for interfacing between the receiving apparatus and a detachable outside memory loadable to said apparatus for storing received image data into the outside memory and for reading out stored image data from the outside memory, said apparatus being selectively operable in at least a first mode wherein received image data is printed by said printer and not stored in the outside memory and a second mode wherein received image data is stored in the outside memory and not printed by said printer;

means for detecting if the outside memory is loaded to said apparatus, and if the loaded outside memory is appropriate for use in said second mode; and means for selecting operation in said second mode when said detecting means detects that the outside memory is loaded and appropriate, and for selecting operation in said first mode otherwise, wherein, in said second mode, said interfacing means also stores identification information of received image data with the received image data into the outside memory.

8. An image receiving apparatus, according to claim 7, further comprising means for displaying the identification information stored in the outside memory.

9. An image receiving apparatus according to claim 8, further comprising means for designating a part of image data stored in the outside memory based on the identification information and means for visualizing the image data designated by said designating means.

10. An image receiving apparatus comprising:

means for receiving image data;

a printer for printing received image data;

means for interfacing between the receiving apparatus and a detachable outside memory loadable to said apparatus for storing received image data into the outside memory and for reading out stored image data from the outside memory;

means for detecting if the outside memory is loaded to said apparatus, and if the loaded outside memory is appropriate for use in storing received image data without printing by said printer; and means for having the received image data into the outside memory without printing by said printer when said detecting means detects that the outside memory is loaded and appropriate for such use, and for printing the received image data by said printer without storing in the outside memory otherwise.

11. An image receiving apparatus, according to claim 10, wherein said interfacing means loads a storing control program storing received image data into the outside memory.

12. An image receiving apparatus, according to claim 10, further comprising means for designating a part of image data among stored image data in the outside memory.

13. An image receiving apparatus, according to claim 10, wherein said interfacing means is structured to have loaded thereto a magnetic flexible disc as the outside memory.

14. An image receiving apparatus, according to claim 10, wherein said interfacing means also stores identification information relating to received image data with the received image data into the outside memory.

15. An image receiving apparatus, according to claim 14, further comprising means for displaying the identification information stored in the outside memory.

16. An image receiving apparatus, according to claim 15, further comprising means for designating a part of image data stored in the outside memory based on the identification information and means for visualizing the image data designated by said designating means.

17. An image receiving method comprising the steps of:

receiving image data;

printing received image data;

storing received image data into a loadable outside memory;

reading out stored image data from the outside memory;

operating in one of at least first mode and second modes, wherein in the first mode received image data is printed and is not stored in the outside memory and in the second mode received image data is stored in the outside memory and is not printed;

detecting if the outside memory is loaded, and if the loaded outside memory is appropriate for use in said second mode; and selecting operation in said second mode when said detecting step detects that the outside memory is loaded and appropriate, and for selecting operation in said first mode otherwise.

18. An image receiving method, according to claim 17, further comprising the step of designating a part of image data among stored image data in the outside memory.

19. A method according to claim 17, wherein, in the detecting step, whether the loaded outside memory has a storing control program for storing received image data into the loaded outside memory is detected.

20. A method according to claim 19, further comprising a step for loading the storing control program from the loaded outside memory.

* * * * *

UNITED STATES PATENT AND TRADEMARK OFFICE
CERTIFICATE OF CORRECTION

PATENT NO. : 5,706,104
DATED : January 6, 1998
INVENTOR(S) : Kenichiro Sugiura, et. al.

It is certified that error appears in the above-indentified patent and that said Letters Patent is hereby corrected as shown below:

COLUMN 1

Line 3, "continuation-in-part" should be deleted;
Line 4, "division," should be deleted; and
Line 60, "what" should read --that--.

COLUMN 3

Line 28, "step 9," should read --step S10,--.

COLUMN 5

Line 41, "data" should read --data stored--.

Signed and Sealed this

Thirtieth Day of June, 1998

Attest:

BRUCE LEHMAN

Attesting Officer          Commissioner of Patents and Trademarks